US011563865B2

(12) United States Patent
Usui

(10) Patent No.: US 11,563,865 B2
(45) Date of Patent: Jan. 24, 2023

(54) PRINTING APPARATUS THAT DISPLAY A SOFTWARE KEYBOARD AND RECEIVES AN INPUT INSTRUCTION FROM THE SOFTWARE KEYBOARD IN ACCORDANCE WITH AN OPERATION RECEIVED FROM A HARDWARE KEY, AND NON-TRANSITORY COMPUTER-READABLE STORAGE MEDIUM STORING PROGRAM

(71) Applicant: SEIKO EPSON CORPORATION, Tokyo (JP)

(72) Inventor: Daigo Usui, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/656,038

(22) Filed: Mar. 23, 2022

(65) Prior Publication Data

US 2022/0311887 A1 Sep. 29, 2022

(30) Foreign Application Priority Data

Mar. 25, 2021 (JP) .............................. JP2021-051271

(51) Int. Cl.
*H04N 1/00* (2006.01)
(52) U.S. Cl.
CPC ....... *H04N 1/00413* (2013.01); *H04N 1/0048* (2013.01); *H04N 1/00387* (2013.01)

(58) Field of Classification Search
None
See application file for complete search history.

(56) References Cited

U.S. PATENT DOCUMENTS

| 10,656,831 B2 * | 5/2020 | Nakanishi | ........... G06F 3/04883 |
| 2014/0118784 A1 * | 5/2014 | Ichiyama | ........... H04N 1/00307 358/1.15 |
| 2017/0251114 A1 * | 8/2017 | Ichiyama | ........... H04N 1/00506 |

FOREIGN PATENT DOCUMENTS

JP  2002-305616 A  10/2002

* cited by examiner

*Primary Examiner* — Henok Shiferaw
(74) *Attorney, Agent, or Firm* — Global IP Counselors, LLP

(57) ABSTRACT

A printing apparatus including: an operation section including a hardware key for receiving a first operation and a hardware key for receiving a direction designating operation for designating a direction from one or more directions; and a printing section. In a first mode, upon receiving the first operation, a first function is executed. In a second mode, upon receiving the direction designating operation, a focus position on a target region is moved in a direction designated by the direction designating operation, and, upon receiving the first operation, the focus position is moved to a position of a first image which is predetermined among a plurality of images.

9 Claims, 7 Drawing Sheets

PRINTING APPARATUS THAT DISPLAY A SOFTWARE KEYBOARD AND RECEIVES AN INPUT INSTRUCTION FROM THE SOFTWARE KEYBOARD IN ACCORDANCE WITH AN OPERATION RECEIVED FROM A HARDWARE KEY, AND NON-TRANSITORY COMPUTER-READABLE STORAGE MEDIUM STORING PROGRAM

The present application is based on, and claims priority from JP Application Serial Number 2021-051271, filed Mar. 25, 2021, the disclosure of which is hereby incorporated by reference herein in its entirety.

BACKGROUND

1. Technical Field

The present disclosure relates to a printing apparatus and a non-transitory computer-readable storage medium storing a program.

2. Related Art

Research and development of printing apparatuses printing an image on a print medium has been ongoing.

In this regard, a printing apparatus that causes a display section to display a software keyboard and receives an input of information from the software keyboard in accordance with an operation received from a hardware key is known from JP-A-2002-305616.

However, in the printing apparatus described in JP-A-2002-305616, a large number of operations may be required to be performed on hardware keys to move a focus position on the software keyboard to a desired key position. As a result, in the printing apparatus, the user may need to take time to input information using the software keyboard.

SUMMARY

According to an aspect of the present disclosure, a printing apparatus includes a control section causing a display section to display a target region in which at least one of a plurality of images is displayed, an operation section including a hardware key for receiving a first operation and a hardware key for receiving a direction designating operation for designating a direction from one or more directions, and a printing section. The control section executes, when the target region is not displayed on the display section, a first function upon receiving the first operation. When the target region is displayed on the display section, the control section causes, upon receiving the direction designating operation, a focus position on the target region to be moved in a direction designated by the direction designating operation and selects an image located at the focus position among the plurality of images as a selected image and causes, upon receiving the first operation, the focus position to be moved to the a position of a first image which is predetermined among the plurality of images and selects the first image as the selected image.

Further, according to an aspect of the present disclosure, a non-transitory computer-readable storage medium stores a program for a computer of an electronic apparatus including an operation section having a hardware key for receiving a first operation and a hardware key for receiving a direction designating operation for designating a direction from one or more directions. The program causes the computer to perform: a first display step of causing a display section to display a target region in which at least one of a plurality of images is displayed; an executing step of executing, when the target region is not displayed on the display section, a first function upon receiving the first operation; a first selection step of causing, when the target region is displayed on the display section, upon receiving the direction designating operation, a focus position on the target region to be moved in a direction designated by the direction designating operation and selecting an image located at the focus position among the plurality of images as a selected image; and a second selection step of causing, when the target region is displayed on the display section, upon receiving the first operation, the focus position to be moved to the position of a first image which is predetermined among the plurality of images and selecting the first image as the selected image.

DESCRIPTION OF EXEMPLARY EMBODIMENTS

Embodiments

Hereinafter, embodiments of the present disclosure will be described with reference to the drawings.

Overview of Printing Apparatus

First, an overview of a printing apparatus according to an embodiment will be described.

The printing apparatus according to the embodiment includes a control section, an operation section, and a printing section. The control section causes a display section to display a target region in which at least one of a plurality of images is displayed. The operation section includes a hardware key for receiving a first operation and a hardware key for receiving a direction designating operation for designating a direction from one or more directions. When the target region is not displayed on the display section, the control section executes a first function upon receiving the first operation. When the target region is displayed on the display section, the control section, upon receiving the direction designating operation, causes a focus position on the target region to be moved in a direction designated by the direction designating operation, and selects an image located at the focus position among the plurality of images as a selected image. In addition, when the target region is displayed on the display section, the control section, upon receiving the first operation, causes the focus position to be moved to the position of a first image which is predetermined among the plurality of images, and selects the first image as a selected image. Thus, the printing apparatus can reduce the time required to move the focus position. For example, the printing apparatus can reduce the time for moving the focus position to the position of the first image. Further, for example, the printing apparatus can reduce the time for moving the focus position to an image adjacent to the first image among the plurality of images.

Hereinafter, a configuration of the printing apparatus according to the embodiment and a process performed by the printing apparatus will be described in detail.

Configuration of Printing Apparatus

Hereinafter, the configuration of the printing apparatus according to the embodiment will be described by taking a printing apparatus 1 as an example.

Figure 1:
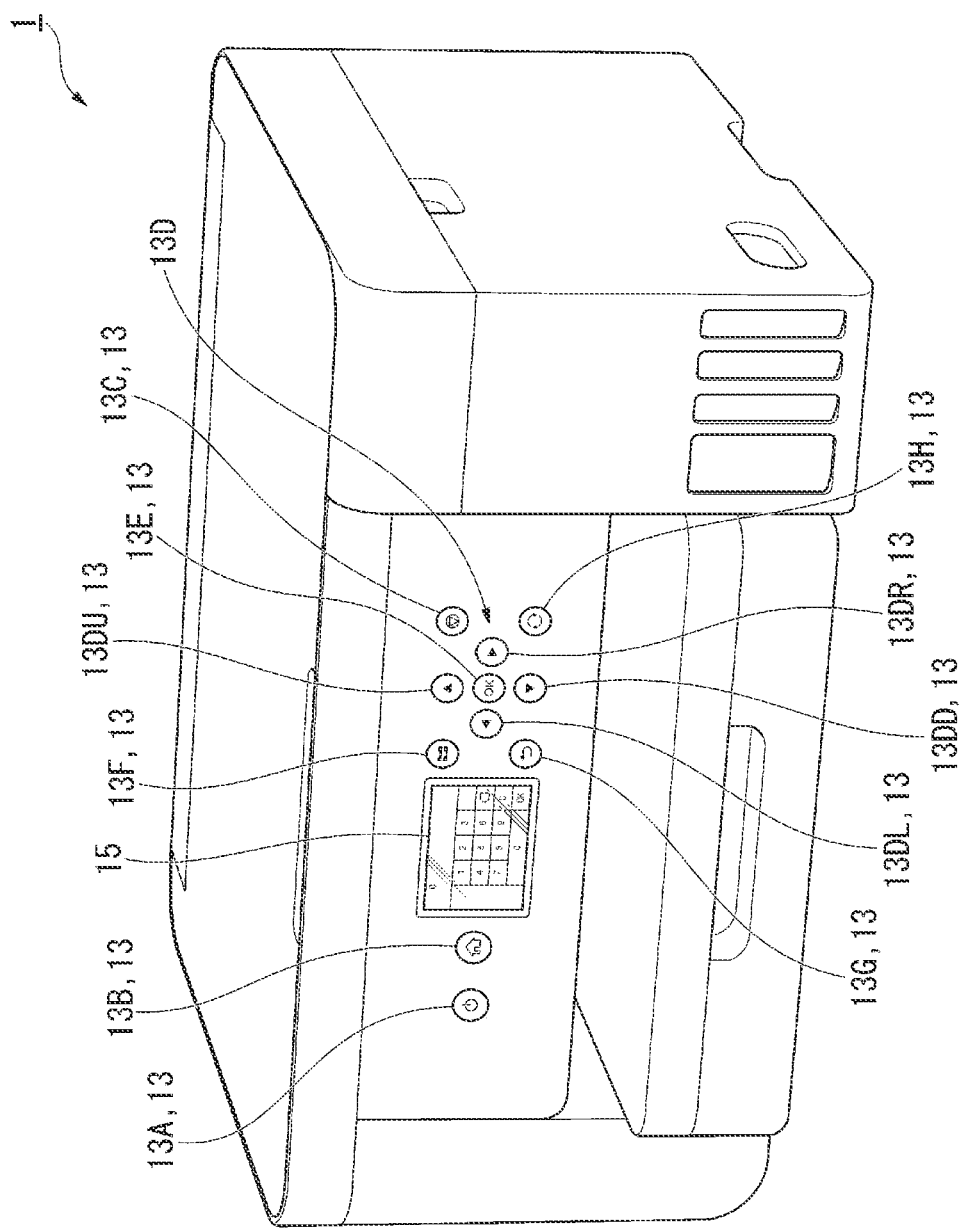
FIG. 1 is a diagram illustrating an example of the appearance of a printing apparatus.
Figure 2:
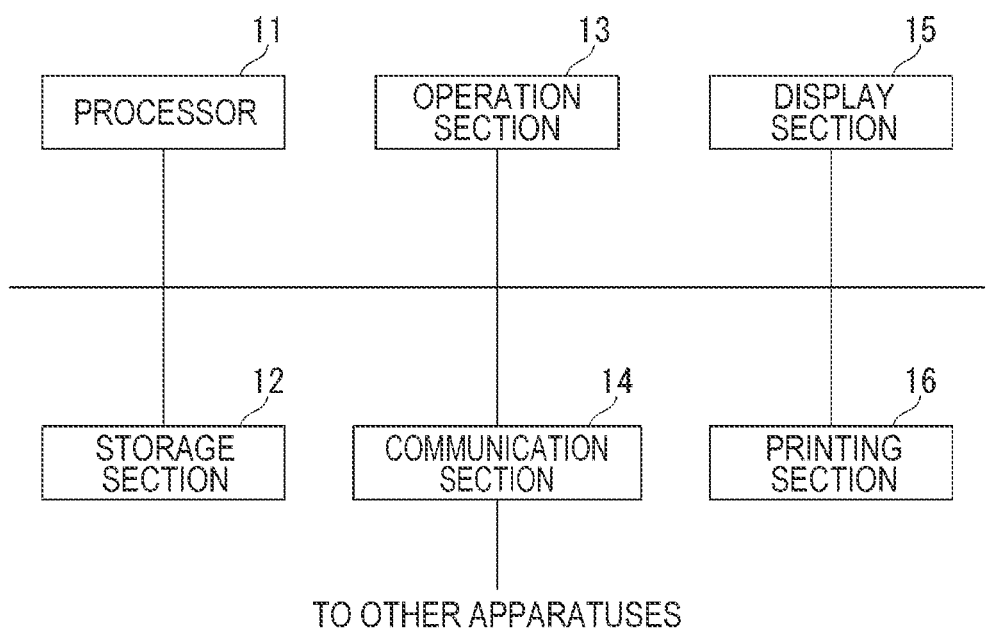
FIG. 2 is a diagram illustrating an example of a hardware configuration of the printing apparatus.

FIG. 1 is a diagram illustrating an example of the appearance of the printing apparatus 1. FIG. 2 is a diagram illustrating an example of a hardware configuration of the printing apparatus 1.

The printing apparatus 1 prints an image on a print medium. The printing apparatus 1 may be any printing apparatus capable of displaying an image and receiving an operation performed by a user who is viewing the displayed image. Hereinafter, for example, a case where the printing apparatus 1 is an ink jet printer will be described. Also hereinafter, for convenience of description, the scanning direction of a print head of the printing apparatus 1 will be referred to as the lateral direction of the printing apparatus 1. Note that the printing apparatus 1 may be a printer of other types, such as a laser printer or a multifunction peripheral, instead of an ink jet printer. In addition, the printing apparatus 1 may be configured to cause a display included in the printing apparatus 1 to display an image or may be configured to cause an external display coupled to the printing apparatus 1 to display an image. Hereinafter, for example, a case where the printing apparatus 1 causes a display included in the printing apparatus 1 to display an image will be described. The printing apparatus 1 receives operations using hardware keys.

The printing apparatus 1 includes a processor 11, a storage section 12, an operation section 13, a communication section 14, a display section 15, and a printing section 16. The constituent elements are communicably coupled to each other via a bus. The printing apparatus 1 may communicate with other apparatuses via the communication section 14.

The processor 11 is, for example, a central processing unit (CPU). Instead of the CPU, the processor 11 may be another processor, such as a field programmable gate array (FPGA). The processor 11 executes various programs stored in the storage section 12.

The storage section 12 may include, for example, a hard disk drive (HDD), a solid state drive (SSD), an electrically erasable programmable read-only memory (EEPROM), a read-only memory (ROM), or a random access memory (RAM). Note that the storage section 12 may be an external storage device coupled via a digital input/output port or the like, such as a universal serial bus (USB), instead of being built in the printing apparatus 1. The storage section 12 stores various types of information, various programs, and the like to be processed by the printing apparatus 1.

The operation section 13 receives an operation performed by a user who is viewing an image displayed on the display section 15. The operation section 13 includes eight operation sections, i.e. an operation section 13A, an operation section 13B, an operation section 13C, an operation section 13D, an operation section 13E, an operation section 13F, an operation section 13G, and an operation section 13H, as hardware keys for receiving operations from the user. In FIG. 2, the eight operation sections are omitted to avoid clutter in the drawing.

The operation section 13A is a hardware key for switching the power of the printing apparatus 1 on and off and is, for example, a power button. Note that the operation section 13A may be another type of hardware key capable of switching on and off the power of the printing apparatus 1, instead of the power button.

The operation section 13B is a hardware key for receiving an operation from the user as a first operation and is, for example, a button for receiving the first operation. Note that the operation section 13B may be another type of hardware key capable of receiving the first operation, instead of the button for receiving the first operation.

The operation section 13C is a hardware key for receiving an operation from the user as a second operation and is, for example, a button for receiving the second operation. Note that the operation section 13C may be another type of hardware key capable of receiving the second operation, instead of the button for receiving the second operation.

The operation section 13D receives a direction designating operation for designating a direction from one or more directions. In the example illustrated in FIG. 1, the operation section 13D includes an operation section 13DU, an operation section 13DD, an operation section 13DL, and an operation section 13DR. In this case, the direction designating operation is an operation on any one of the four operation sections 13DU, 13DD, 13DL, and 13DR. In this embodiment, four directions are designated by operations on the four operation sections. The direction designating operation may be an operation on two or more of the four operation sections. However, the operation section 13 may be configured of only one operation section for designating only one direction.

The operation section 13DU is a hardware key for receiving a direction designating operation for designating a predetermined first direction on the display area of the display section 15 and is, for example, a button for receiving the direction designating operation. Hereinafter, for example, a case will be described where the first direction is a positive direction of the Y-axis of a two-dimensional orthogonal coordinate system indicating a position on the display region, that is, an upward direction on the display region. In the example illustrated in FIG. 1, the Y-axis is an axis parallel to the direction of gravity but may be an axis non-parallel to the direction of gravity. Further, the operation section 13DU may be another type of hardware key capable of receiving the direction designating operation, instead of the button for receiving the direction designating operation.

The operation section 13DD is a hardware key for receiving a direction designating operation for designating a predetermined second direction on the display area of the display section 15 and is, for example, a button for receiving the direction designating operation. Hereinafter, for example, a case where the second direction is a direction opposite to the first direction will be described. In this case, the second direction is a negative direction of the Y-axis of the two-dimensional orthogonal coordinate system indicating a position on the display area, that is, a downward direction on the display area. Note that the operation section 13DD may be another type of hardware key capable of receiving the direction designating operation, instead of the button for receiving the direction designating operation.

The operation section 13DL is a hardware key for receiving a direction designating operation for designating a predetermined third direction on the display area of the display section 15 and is, for example, a button for receiving the direction designating operation. Hereinafter, for example, a case will be described where the third direction is a negative direction of the X-axis of the two-dimensional orthogonal coordinate system indicating a position on the display region, that is, the left direction on the display region. In this case, the third direction is a direction orthogonal to the first direction. In the example illustrated in FIG. 1, the X-axis is an axis parallel to the lateral direction of the printing apparatus 1 but may be an axis non-parallel to the lateral direction of the printing apparatus 1. Further, the operation section 13DL may be another type of hardware key capable of receiving the direction designating operation, instead of the button for receiving the direction designating operation.

The operation section 13DR is a hardware key for receiving a direction designating operation for designating a predetermined fourth direction on the display area of the display section 15 and is, for example, a button for receiving the direction designating operation. Hereinafter, for example, a case where the fourth direction is a direction opposite to the third direction will be described. In this case, the fourth direction is a positive direction of the X-axis of the two-dimensional orthogonal coordinate system indicating a position on the display area, that is, the right direction on the display area. Note that the operation section 13DR may be another type of hardware key capable of receiving the direction designating operation, instead of the button for receiving the direction designating operation.

Instead of the upward direction on the display area of the display section 15, the first direction may be another predetermined direction on the display area as long as the first direction is a direction different from any of the second direction, the third direction, and the fourth direction. Further, instead of the downward direction on the display region, the second direction may be another predetermined direction on the display region as long as the second direction is a direction different from any of the first direction, the third direction, and the fourth direction. Further, instead of the left direction on the display region, the third direction may be another predetermined direction on the display region as long as the third direction is a direction different from any of the first direction, the second direction, and the fourth direction. Further, instead of the right direction on the display region, the fourth direction may be another predetermined direction on the display region as long as the fourth direction is a direction different from any of the first direction, the second direction, and the third direction.

The operation section 13E is a hardware key for receiving an operation for confirming selection of various types of information, selection of various functions, and the like selected by the user via various images displayed on the display section 15 and is, for example, a button for receiving the operation. Note that the operation section 13E may be another type of hardware key capable of receiving the operation, instead of the button for receiving the operation.

The operation section 13F is a hardware key for receiving an operation for causing the display section 15 to display a setting reception image for receiving a setting of a sheet to be used as a print medium and is, for example, a button for receiving the operation. Note that the operation section 13F may be another type of hardware key capable of receiving the operation, instead of the button for receiving the operation.

The operation section 13G is a hardware key for receiving an operation for causing the display section 15 to display, instead of an image currently being displayed on the display section 15, an image having being displayed on the display section 15 before the image currently being displayed. For example, the operation section 13G is a button for receiving the operation. Note that the operation section 13G may be another type of hardware key capable of receiving the operation, instead of the button for receiving the operation.

The operation section 13H is a hardware key for receiving an operation for causing the display section 15 to display a predetermined image and is, for example, a button for receiving the operation. Note that the operation section 13H may be another type of hardware key capable of receiving the operation, instead of the button for receiving the operation. Here, examples of the image include a help image including a text describing a method of performing a process, a procedure, or the like desired by the user.

Note that the operation section 13 may include other hardware keys in addition to the eight operation sections. In addition, the operation section 13 may not include some or all of the operation section 13F, the operation section 13G, and the operation section 13H. The operation section 13 may include other hardware keys instead of some or all of the operation section 13F, the operation section 13G, and the operation section 13H.

The communication section 14 includes, for example, a digital input/output port such as a USB, an Ethernet (registered trademark) port, and the like.

The display section 15 displays an image. The display section 15 is a display device which may include, as a display provided in the printing apparatus 1, a liquid crystal display panel, an organic electroluminescence (EL) display panel, or the like.

The printing section 16 prints an image on a print medium by an ink jet method in accordance with an operation received from the user via the operation section 13. The printing section 16 includes, for example, a print head for printing an image on a print medium, various mechanisms for moving the print head in a scanning direction of the print head, and a transport mechanism for transporting the print medium.

The printing apparatus 1 having the above-described configuration causes the display section 15 to display a target image P1 in accordance with a received operation. The target image P1 is an image including a target region RR. The target region RR is a region in which at least one of a plurality of images selectable in the target image P1 is displayed.

Here, for example, a case where all of a plurality of images selectable in the target image P1 are displayed in the target region RR will be described below. When the target region RR is a region in which some of the images selectable in the target image P1 are displayed, the plurality of images are moved in accordance with a focus position on the target region RR. That is, in this case, in the target region RR, the plurality of images are scrolled in accordance with the focus position on the target region RR. In this way, even in the above-described case, all of the plurality of images selectable in the target image P1 can be displayed in the target region RR.

Hereinafter, for example, a case where the target image P1 is a numeric keypad image indicating a numeric keypad will be described. In this case, each of the plurality of images selectable in the target image P1 is an image selectable in the numeric keypad image. The target image P1 may be an image showing a software keyboard, instead of the numeric keypad image. In this case, the plurality of images selectable in the target image P1, that is, the images displayed in the target region RR are images selectable in an image indicating the software keyboard, such as an image associated with the letters of the alphabet. Further, the target image P1 may be an image indicating a photo album in which an image indicating a desired photograph can be selected from images representing a plurality of photographs. In this case, an image selectable in the target image P1, that is, an image displayed in the target region RR is an image selectable in the image indicating the photo album of the images indicating each of the plurality of photographs. The target image P1 may be another image including the target region RR in which at least one of a plurality of selectable images is displayed. The printing apparatus 1 does not have hardware keys corresponding one-to-one to the plurality of selectable images included in the target image P1. The number of hardware keys is often reduced to avoid an increase in cost due to provision of a large number of hardware keys or to avoid an increase in size due to provision of a large number of hardware keys, for example. Thus, when the user desires to select any of the plurality of selectable images, the selection cannot be made by the user simply operating one hardware key.

Figure 3:
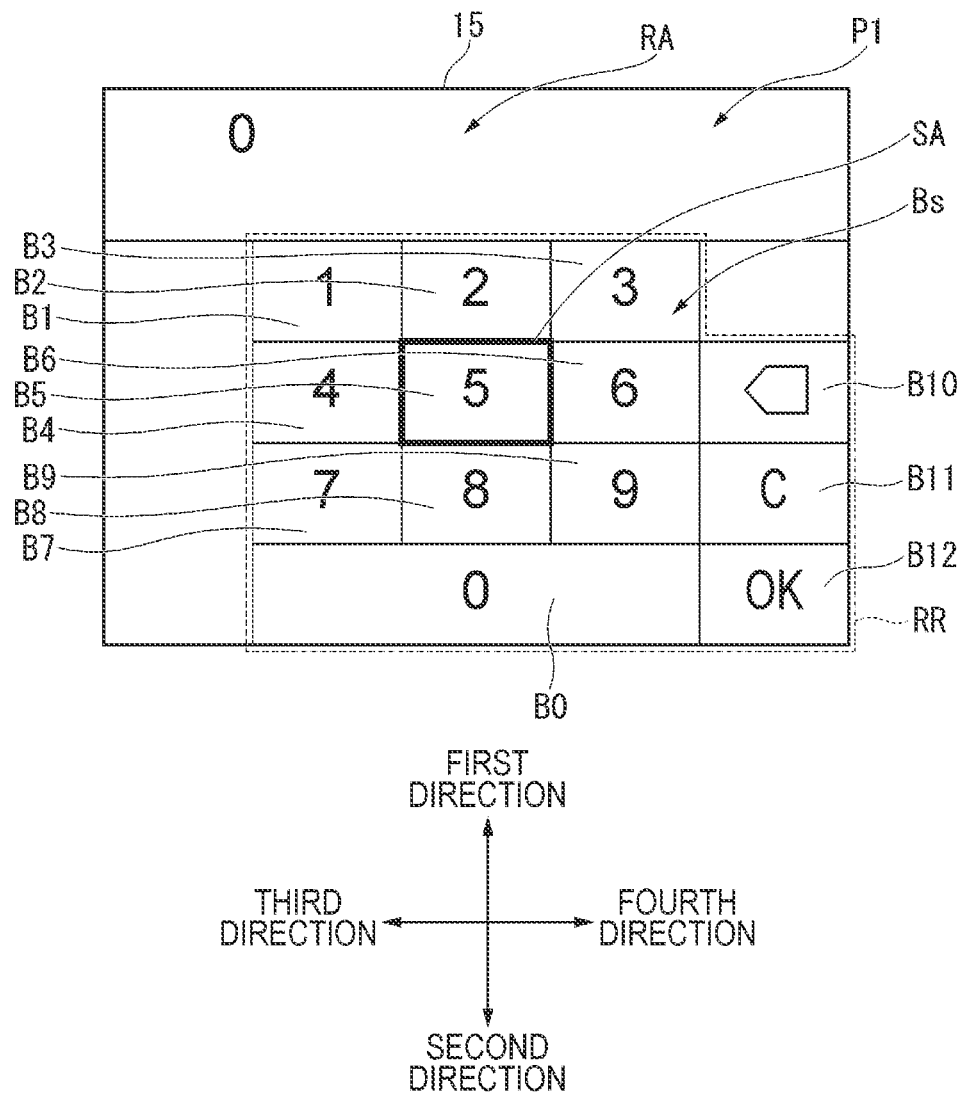
FIG. 3 is a diagram illustrating an example of a target image.

FIG. 3 is a diagram illustrating an example of the target image P1. The screen illustrated in FIG. 3 is an example of a screen displayed in a situation where it is necessary to input a number, such as the number of printed sheets. The case where this screen is displayed corresponds to a second case. The arrows illustrated in FIG. 3 indicate a first direction, a second direction, a third direction, and a fourth direction on the target image P1. As illustrated in FIG. 3, the target image P1 includes the target region RR. In the example illustrated in FIG. 3, the target image P1 includes a region RA as well as the target region RR. As illustrated in FIG. 3, when the target image P1 is a numeric keypad image, the target region RR is a region in which, in accordance with an operation received by the printing apparatus 1 from the user, selection of a number to be input, input of the selected number, cancellation of the input number, confirmation of the input number, or the like is performed. On the other hand, the area RA is an area in which the number input in the target region RR is displayed. For example, when three numbers "1", "3", and "4" are input in the order of "1", "3", and "4" in the target region RR, the three numbers are displayed side by side in the input order, such as "134" in the region RA.

In the example illustrated in FIG. 3, 13 buttons are displayed in the target region RR as an example of a plurality of images that can be selected as a selected image by moving the focus position. The 13 buttons are software keys. The target image P1 may include 12 or fewer buttons, or may include 14 or more buttons. Some or all of the 13 buttons may be images other than those of buttons as long as they can be selected as a selected image by moving the focus position.

Here, in FIG. 3, among the 13 buttons displayed in the target region RR, 10 buttons of buttons B0 to B9 are collectively shown as a numeric button group Bs. The buttons B0 to B9 are images associated with 10 numbers selectable on the numeric keypad indicated by the target image P1. Specifically, the button B0 is an image associated with "0". The button B1 is an image associated with "1". The button B2 is an image associated with "2". The button B3 is an image associated with "3". The button B4 is an image associated with "4". The button B5 is an image associated with "5". The button B6 is an image associated with "6". The button B7 is an image associated with "7". The button B8 is an image associated with "8". The button B9 is an image associated with "9".

For example, in a state in which the focus is located at the position of the button B0, when the printing apparatus 1 receives an operation via the operation section 13E, "0" is displayed in the area RA. Further, for example, in a state in which the focus is located at the position of the button B4, when the printing apparatus 1 receives an operation via the operation section 13E, "4" is displayed in the area RA. Here, in the target image P1, the focus position is moved in accordance with a direction designating operation received by the printing apparatus 1 via the operation section 13D. In the example illustrated in FIG. 3, a frame SA indicates the focus position on the target image P1. That is, in the illustrated example, the focus is located at the position of the button B5. In a case in which the focus is located at the position of the button B5, when the printing apparatus 1 receives a direction designating operation via the operation section 13DU, for example, the focus position moves in the first direction indicated by the direction designating operation. That is, in this case, the focus position moves from the position of the button B5 to the position of the button B2. As a result, the printing apparatus 1 selects the button B2 as the selected image. Further, in a case in which the focus is located at the position of the button B5, when the printing apparatus 1 receives a direction designating operation via the operation section 13DL, for example, the focus position moves in the third direction indicated by the direction designating operation. That is, in this case, the focus position moves from the position of the button B5 to the position of the button B4. As a result, the printing apparatus 1 selects the button B4 as the selected image.

Further, the target image P1 includes a button B10 which is an image associated with a function of canceling a number just previously input via the numeral button group Bs. That is, in a case in which the focus is located at the position of the button B10 in the target image P1 and the button B10 is selected as the selected image, when the printing apparatus 1 receives an operation via the operation section 13E, the number just previously displayed is deleted from among one or more numbers displayed in the region RA. Thus, the function associated with the button B10 corresponds to the function assigned to the backspace key of a keyboard.

Further, the target image P1 includes a button B11 which is an image associated with a function of canceling all numbers input via the numeral button group Bs. That is, in a case in which the focus is located at the position of the button B11 in the target image P1 and the button B11 is selected as the selected image, when the printing apparatus 1 receives an operation via the operation section 13E, all of one or more numbers displayed in the region RA are deleted.

In addition, the target image P1 includes a button B12 which is an image associated with a function of terminating the input of a number via the numeral button group Bs. In other words, the button B12 is an image associated with a function of confirming the input of a number via the numeral button group Bs. That is, in a case in which the focus is located at the position of the button B12 in the target image P1 and the button B12 is selected as the selected image, when the printing apparatus 1 receives an operation via the operation section 13E, the input of one or more numbers displayed in the region RA is confirmed and the display of the target image P1 on the display section 15 is deleted.

Here, for example, as illustrated in FIG. 3, in a case in which the focus is located at the position of the button B5, when the user of the printing apparatus 1 attempts to move the focus position to the position of the button B12, the user needs to perform the direction designating operation via the operation section 13D at least three times. The user, when causing the printing apparatus 1 to perform a desired process, may find the operation involving a plurality of direction designating operations annoying. Thus, when the target image P1 is displayed on the display section 15, the printing apparatus 1, upon receiving the above-described first operation, causes the focus position to be moved to a position of a first image which is predetermined and selects the first image as the selected image. Here, the first image may be any one of the 13 buttons selectable in the target image P1. Hereinafter, for example, a case where the first image is the button B12 will be described. In this way, the printing apparatus 1 can reduce the time required to move the focus position. More specifically, the printing apparatus 1 can reduce the time required to move the focus to the position of the button B12. As a result, the printing apparatus 1 can improve user operability. In other words, the printing apparatus 1 saves the user from having to perform a complicated operation.

Figure 4:
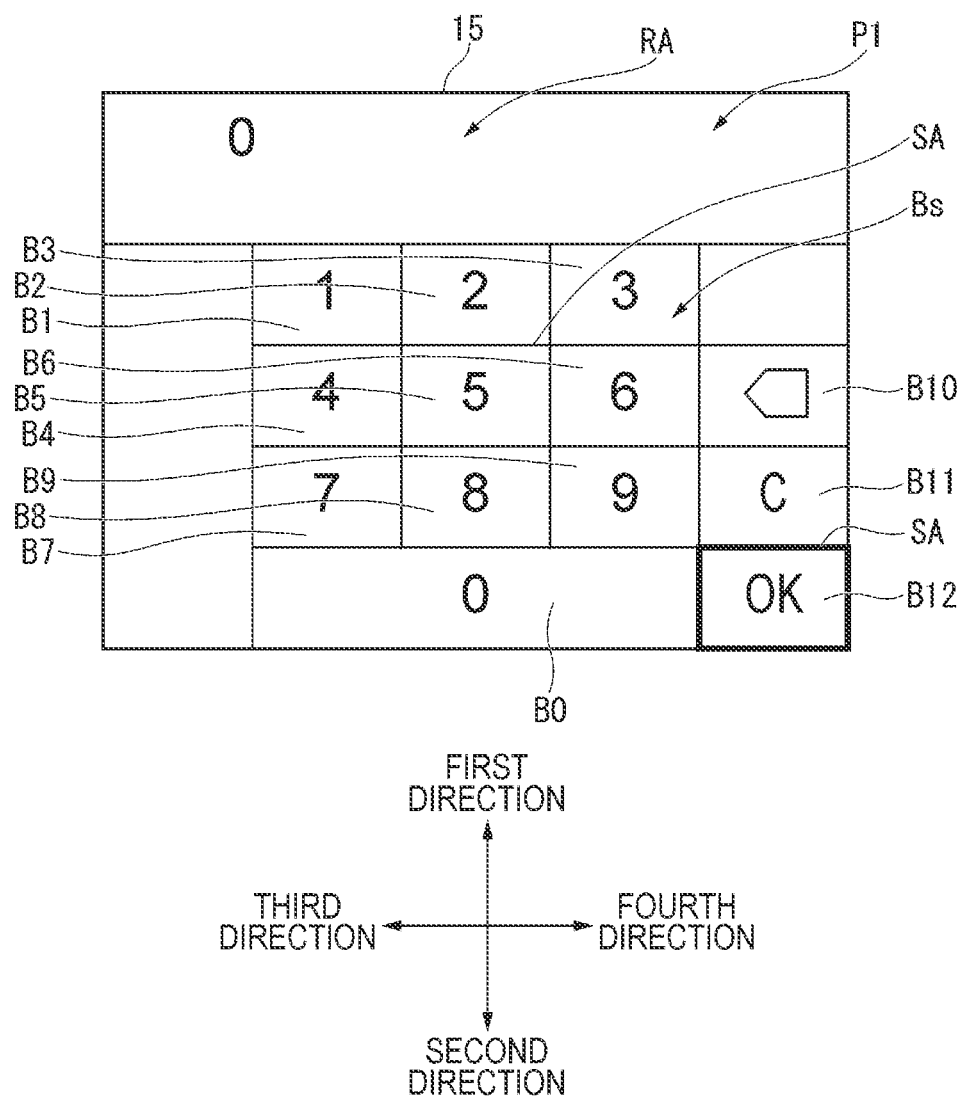
FIG. 4 is a diagram illustrating an example of a focus position after a first operation is performed when a button is selected as a selected image.

FIG. 4 is a diagram illustrating an example of the focus position after the first operation is performed when the button B5 is selected as the selected image. As illustrated in FIG. 4, when the button B5 is selected as the selected image, the focus position after the first operation is performed is moved from the position of the button B5 to the position of the button B12.

When the printing apparatus 1 receives the first operation in a case in which the target image P1 is not displayed on the display section 15, the printing apparatus 1 executes a first function. The first function is a function of causing the display section 15 to display an image indicating a predetermined home screen. In other words, the first function is a function of transitioning to the predetermined home screen. For this reason, the operation section 13B may be referred to as a home button or the like. That is, in the printing apparatus 1, different functions are assigned to the first operation via the operation section 13B in accordance with the image displayed on the display section 15. Here, the image indicating the predetermined home screen is, for example and without limitation, an image indicating an operation menu of the printing apparatus 1.

Further, for example, as illustrated in FIG. 3, in a case in which the focus is located at the position of the button B5, when the user of the printing apparatus 1 attempts to move the focus position to the button B10, the user needs to perform the direction designating operation via the operation section 13D at least twice. Therefore, in a case in which the target image P1 is displayed on the display section 15, when the printing apparatus 1 receives the above-described second operation, the printing apparatus 1 causes the focus position to be moved to a position of a second image which is predetermined and selects the second image as the selected image. Here, the second image may be any one of the 13 buttons selectable in the target image P1. That is, the second image may be the same image as the first image in the target image P1 or may be an image different from the second image. Hereinafter, for example, a case where the second image is the button B11 different from the button B12 of the first image will be described. In this way, the printing apparatus 1 can reduce the time required to move the focus position. More specifically, the printing apparatus 1 can reduce the time required to move the focus position to the position of the button B11. As a result, the printing apparatus 1 can improve user operability. In other words, the printing apparatus 1 saves the user from having to perform a complicated operation. Here, in the present embodiment, description with reference to the drawings of the manner in which the focus position moves from the position of the button B5 to the position of the button B10 is omitted, as it is the same as the manner in which the focus position moves from the position of the button B5 to the position of the button B12.

The printing apparatus 1, upon receiving the second operation when the target image P1 is not displayed on the display section 15, executes the second function. The second function is a function of causing the display section 15 to display an image for confirming whether to stop execution of printing by the printing section 16. Therefore, the operation section 13C may be referred to as a stop button, a cancel button, or the like. That is, in the printing apparatus 1, different functions are also assigned to the second operation via the operation section 13B in accordance with the image displayed on the display section 15.

Even when the target image P1 is displayed on the display section 15, the printing apparatus 1 may be configured to execute the first function upon receiving the first operation. In this configuration, the printing apparatus 1, upon receiving the second operation in the above-described case, causes the focus position to be moved to the position of the second image and selects the second image as the selected image.

In addition, even when the target image P1 is displayed on the display section 15, the printing apparatus 1 may be configured to execute the second function upon receiving the above-described second operation. In this configuration, the printing apparatus 1, upon receiving the first operation in the above-described case, causes the focus position to be moved to the position of the first image and selects the first image as the selected image.

In addition, when the target image P1 is displayed on the display section 15, the printing apparatus 1, upon receiving the first operation, may be configured to move the focus position to the position of the second image and to select the second image as the selected image. In this case, when the target image P1 is displayed on the display section 15, the printing apparatus 1, upon receiving the second operation, may be configured to move the focus position to the position of the first image and to select the first image as the selected image, or may be configured to execute the second operation.

In addition, when the target image P1 is displayed on the display section 15, the printing apparatus 1, upon receiving the second operation, may be configured to move the focus position to the position of the first image and to select the first image as the selected image. In this case, when the target image P1 is displayed on the display section 15, the printing apparatus 1, upon receiving the first operation, may be configured to move the focus position to the position of the second image and select the second image as the selected image, or may be configured to execute the first operation.

Further, at least one of the first image and the second image may be a button located at the initial focus position among the buttons B0 to B12. The button located at the initial focus position among the buttons B0 to B12 is, for example and without limitation, the button B5.

In addition, the printing apparatus 1 may be configured to receive the first operation via a hardware key other than the operation section 13B among the hardware keys included in the operation section 13. For example, the printing apparatus 1 may be configured to receive the first operation via the operation section 13F.

In addition, the printing apparatus 1 may be configured to receive the second operation via a hardware key other than the operation section 13C among the hardware keys included in the operation section 13. For example, the printing apparatus 1 may be configured to receive the second operation via the operation section 13F.

Functional Configuration of Printing Apparatus

Figure 5:
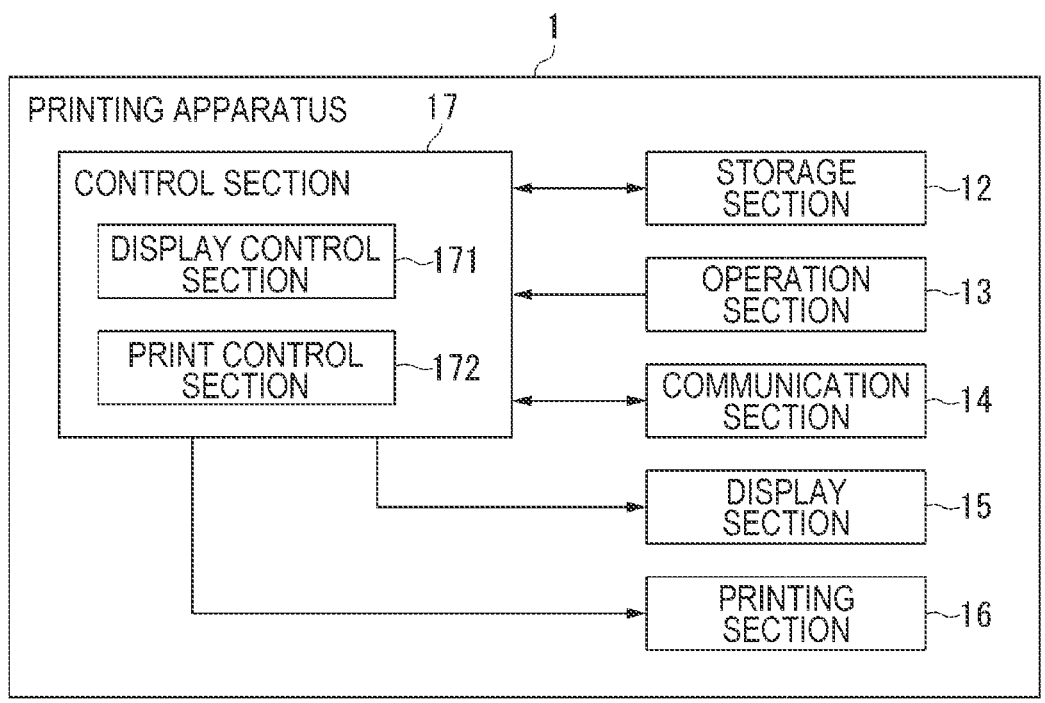
FIG. 5 is a diagram illustrating an example of a functional configuration of the printing apparatus.

Hereinafter, a functional configuration of the printing apparatus 1 will be described with reference to FIG. 5. FIG. 5 is a diagram illustrating an example of the functional configuration of the printing apparatus 1.

The printing apparatus 1 includes the storage section 12, the operation section 13, the communication section 14, the display section 15, the printing section 16, and a control section 17.

The control section 17 controls the entirety of the printing apparatus 1. The control section 17 includes a display control section 171 and a print control section 172. The functional sections included in the control section 17 are implemented by, for example, the processor 11 executing various programs stored in the storage section 12. Some or all of the functional sections may be hardware functional sections, such as a large scale integrated (LSI), an application specific integrated circuit (ASIC), and the like.

The display control section 171 generates an image corresponding to an operation received via the operation section 13. The display control section 171 causes the display section 15 to display the generated image. For example, the display control section 171 generates a target image P1 in accordance with an operation received via the operation section 13. Then, the display control section 171 causes the display section 15 to display the generated target image P1. Further, for example, the display control section 171 switches various displays of the target image P1 in accordance with an operation received via the operation section 13.

The print control section 172 controls the printing section 16 in accordance with an operation received via the operation section 13 and prints an image on a print medium.

Figure 6:
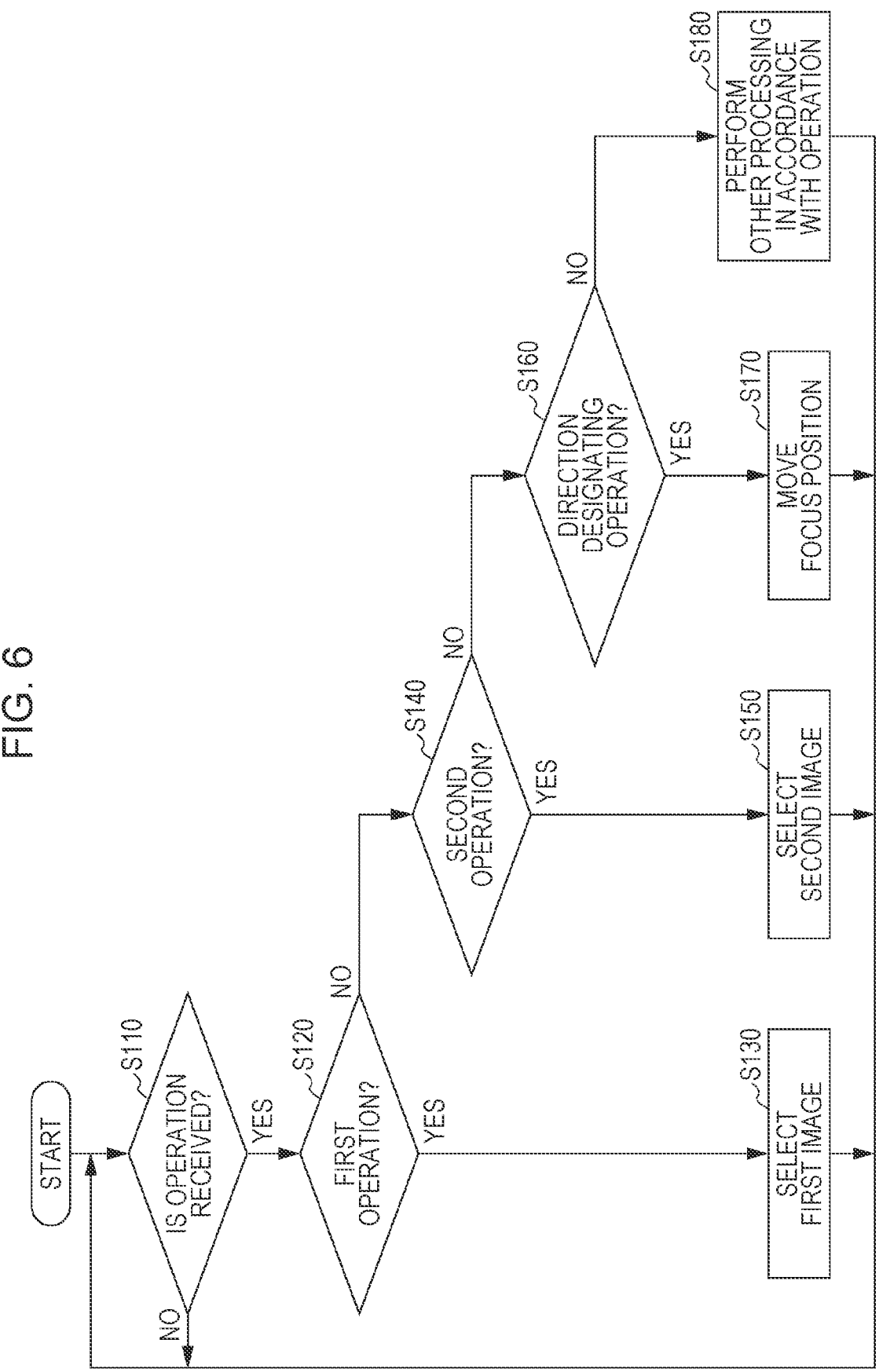
FIG. 6 is a diagram illustrating an example of a flow of processing performed by the printing apparatus when the target image is displayed on a display section.

Process Performed by Printing Apparatus when Target Image is Displayed on Display Section Hereinafter, a process performed by the printing apparatus 1 when the target image P1 is displayed on the display section 15 will be described with reference to FIG. 6. FIG. 6 is a diagram illustrating an example of a flow of a process performed by the printing apparatus 1 when the target image P1 is displayed on the display section 15. The printing apparatus 1 repeatedly executes the process of the flowchart illustrated in FIG. 6 while the target image P1 is being displayed on the display section 15. Hereinafter, for example, a case will be described where the target image P1 is displayed on the display section 15 at a timing before the processing of step S110 illustrated in FIG. 6 is started.

After the target image P1 is displayed on the display section 15 in accordance with an operation received in advance, the display control section 171 waits until an operation is received via the operation section 13 (step S110).

When it is determined that an operation via the operation section 13 is received in step S110 (YES in step S110), the display control section 171 determines whether the operation received via the operation section 13 in step S110 is the first operation (step S120).

When it is determined that the operation received via the operation section 13 in step S110 is the first operation (YES in step S120), the display control section 171 causes the focus position to be moved to the position of the first image and selects the first image as the selected image (step S130). In FIG. 6, the processing of step S130 is indicated by "Select first image". After the processing of step S130 is performed, the process proceeds to step S110 and the display control section 171 waits again until an operation is received via the operation section 13.

On the other hand, when it is determined that the operation received via the operation section 13 in step S110 is not the first operation (NO in step S120), the display control section 171 determines whether the operation received via the operation section 13 in step S110 is the second operation (step S140).

When it is determined that the operation received via the operation section 13 in step S110 is the second operation (YES in step S140), the display control section 171 causes the focus position to be moved to the position of the second image and selects the second image as the selected image (step S150). In FIG. 6, the processing of step S150 is indicated by "Select second image". After the processing of step S150 is performed, the process proceeds to step S110 and the display control section 171 waits again until an operation is received via the operation section 13.

On the other hand, when it is determined that the operation received via the operation section 13 in step S110 is not the second operation (NO in step S140), the display control section 171 determines whether the operation received via the operation section 13 in step S110 is a direction designating operation (step S160).

When it is determined that the operation received via the operation section 13 in step S110 is a direction designating operation (YES in step S160), the display control section 171 causes the focus position to be moved in the direction designated by the received direction designating operation (step S170). After the processing of step S170 is performed, the process proceeds to step S110 and the display control section 171 waits again until an operation is received via the operation section 13.

On the other hand, when it is determined that the operation received via the operation section 13 in step S110 is not a direction designating operation (NO in step S160), the display control section 171 performs another processing corresponding to the operation received via the operation section 13 in step S110 (step S180). For example, when the operation has been received via the operation section 13E, input of a number associated with an image selected as the selected image, execution of a function associated with an image selected as the selected image, or the like is performed. In the present embodiment, detailed description of other such processing is omitted. After the processing of step S180 is performed, the process proceeds to step S110 and the display control section 171 waits again until an operation is received via the operation section 13.

The display control section 171 may be configured to execute the first function upon receiving the first operation in a state in which the focus is located at the position of the first image. Further, the display control section 171 may be configured to execute the second function upon receiving the second operation in a state in which the focus is located at the position of the second image. As a result, although the user cannot execute the first function by performing the first operation only once in a state in which the focus is not located at the position of the first image, the user can execute the first function by performing the first operation twice in a state in which the focus is not located at the position of the first image. Even when a user who thinks that the first operation is an operation for executing the first function aims to execute the first function in a state in which the target image is displayed on the display section 15, the user can easily execute the first function by simply repeating the first operation twice. Similarly, although the user cannot execute the second function by performing the second operation only once in a state in which the focus is not located at the position of the second image, the user can execute the second function by performing the second operation twice in a state in which the focus is not located at the position of the second image.

Figure 7:
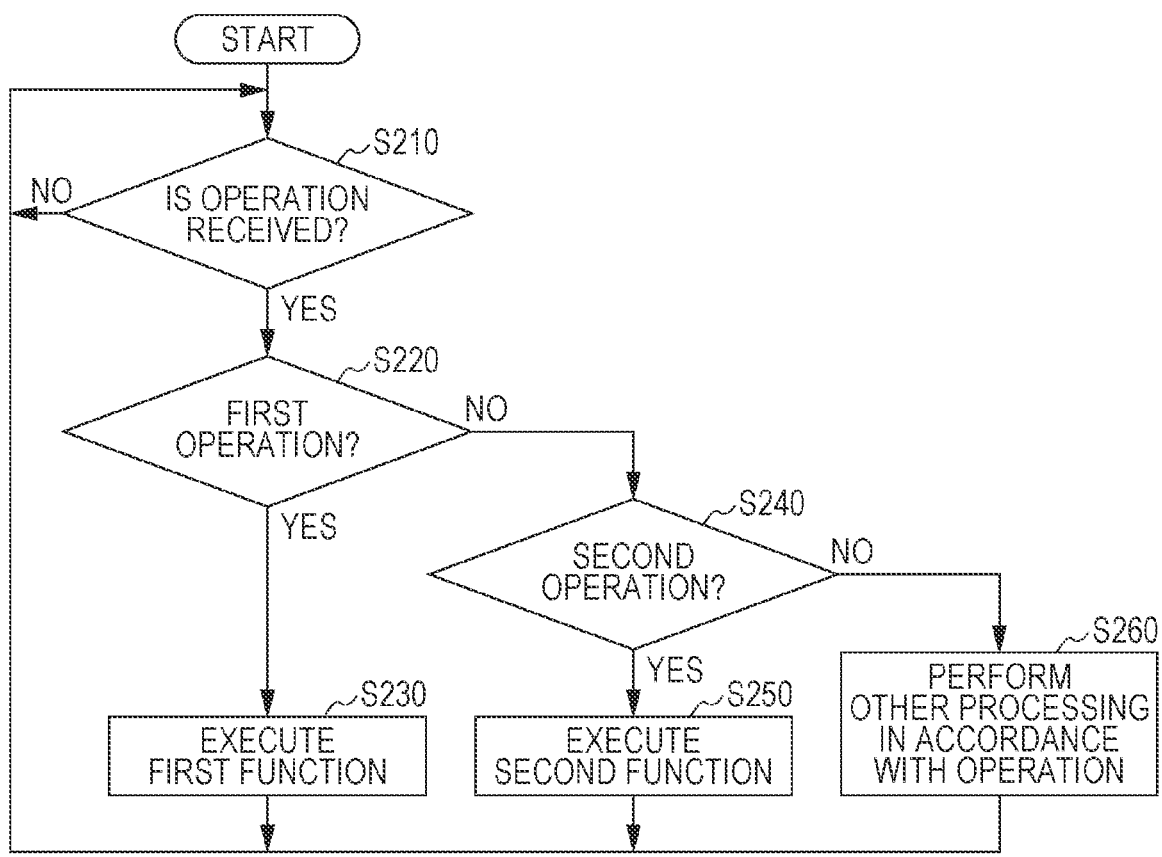
FIG. 7 is a diagram illustrating an example of a flow of processing performed by the printing apparatus when the target image is not displayed on the display section.

Process Performed by Printing Apparatus when Target Image is Not Displayed on Display Section Hereinafter, a process performed by the printing apparatus 1 when the target image P1 is not displayed on the display section 15 will be described with reference to FIG. 7. FIG. 7 indicates a process performed in a scene among scenes that do not require input of a number. This case corresponds to a first case where, for example, either color printing or monochrome printing is selected as a print setting. FIG. 7 is a diagram illustrating an example of a flow of the process performed by the printing apparatus 1 when the target image P1 is not displayed on the display section 15. The printing apparatus 1 repeatedly executes the process of the flowchart illustrated in FIG. 7 while an image different from the target image P1 is being displayed on the display section 15. Hereinafter, for example, a case will be described where an image different from the target image P1 is displayed on the display section 15 at a timing before the processing of step S110 illustrated in FIG. 7 is performed. The image different from the target image P1 may be any image other than the target image P1 that can be displayed on the display section 15 by the printing apparatus 1.

After an image different from the target image P1 is displayed on the display section 15 in accordance with an operation received in advance, the display control section 171 waits until an operation is received via the operation section 13 (step S210).

When it is determined that an operation via the operation section 13 is received in step S210 (YES in step S210), the display control section 171 determines whether the operation received via the operation section 13 in step S210 is the first operation (step S220).

When it is determined that the operation received via the operation section 13 in step S210 is the first operation (YES in step S220), the display control section 171 executes the above-described first function (step S230). After the processing of step S230 is performed, the process proceeds to step S210 and the display control section 171 waits again until an operation is received via the operation section 13.

On the other hand, when it is determined that the operation received via the operation section 13 in step S210 is not the first operation (NO in step S220), the display control section 171 determines whether the operation received via the operation section 13 in step S210 is the second operation (step S240).

When it is determined that the operation received via the operation section 13 in step S210 is the second operation (YES in step S240), the display control section 171 executes the above-described second function (step S250). After the processing of step S250 is performed, the process proceeds to step S210 and the display control section 171 waits again until an operation is received via the operation section 13.

On the other hand, when it is determined that the operation received via the operation section 13 in step S210 is not the second operation (NO in step S240), the display control section 171 performs another processing corresponding to the operation received via the operation section 13 in step S210 (step S260). For example, when the operation is a direction designating operation received via the operation section 13D, movement of the focus position in a direction designated by the received direction designating operation, execution of a function associated with the direction, or the like is performed. In the present embodiment, detailed description of other such processing is omitted. After the processing of step S260 is performed, the process proceeds to step S210 and the display control section 171 waits again until an operation is received via the operation section 13.

As described above, when the target image P1 is not displayed on the display section 15, the printing apparatus 1 executes the first function upon receiving the first operation. When the target image P1 is displayed on the display section 15, the printing apparatus 1, upon receiving a direction designating operation, causes the focus position on the target image P1 to be moved in a direction designated by the direction designating operation and selects an image located at the focus position as the selected image from among a plurality of images displayed on the target image P1 and, upon receiving the first operation, causes the focus position to be moved to the position of a first image which is predetermined among the plurality of images and selects the first image as the selected image. In this way, the printing apparatus 1 can reduce the time required to move the focus position.

The functions of the printing apparatus 1 described above may be applied to other electronic devices, such as a scanner. Although the printing apparatus 1 described above does not include a touch panel integrated with the display section 15, the printing apparatus 1 may include a touch panel integrated with the display section 15.

As described above, a printing apparatus according to an embodiment includes a control section causing a display section to display a target region in which at least one of a plurality of images is displayed, an operation section including a hardware key for receiving a first operation and a hardware key for receiving a direction designating operation for designating a direction from one or more directions, and a printing section. The control section executes, when the target region is not displayed on the display section, a first function upon receiving the first operation. When the target region is displayed on the display section, the control section causes, upon receiving the direction designating operation, a focus position on the target region to be moved in a direction designated by the direction designating operation and selects an image located at the focus position among the plurality of images as a selected image and causes, upon receiving the first operation, the focus position to be moved to the position of a first image which is predetermined among the plurality of images and selects the first image as a selected image. Thus, the printing apparatus can reduce the time required to move the focus position. Here, in the example described above, the printing apparatus 1 is an exemplary printing apparatus. Further, in the example described above, the target region RR is an exemplary target region. In the example described above, the display section 15 is an exemplary display section. In the example described above, the control section 17 is an exemplary control section. In the example described above, each of the operation section 13B and the operation section 13C is an example of a hardware key for receiving the first operation. In the example described above, the operation section 13D is an example of a hardware key for receiving a direction designating operation. In the example described above, the printing section 16 is an exemplary printing section. In the example described above, each of the button B12 and the button B11 is an example of the first image.

The printing apparatus may be configured such that the first function is a function of causing the display section to display an image indicating a predetermined home screen.

The printing apparatus may be configured such that the first image is an image associated with a function of confirming the input of information in the target region.

The printing apparatus may be configured such that the first function is a function of causing the display section to display an image for confirming whether to stop execution of printing by the printing section.

The printing apparatus may be configured such that the first image is an image associated with a function of canceling information just previously input in the target region.

The printing apparatus may be configured such that the control section executes the first function upon receiving the first operation in a state in which the focus position is the position of the first image.

The printing apparatus may be configured such that each of the plurality of images is an image selectable in a numeric keypad image indicating a numeric keypad.

The printing apparatus may be configured such that the operation section further includes a hardware key for receiving a second operation. The control section executes, when the target region is not displayed on the display section, upon receiving the second operation, a second function different from the first function. The control section causes, when the target region is displayed on the display section, upon receiving the second operation, the focus position to be moved to the position of a second image which is predetermined among the plurality of images and selects the second image as the selected image. In the example described above, each of the operation section 13C and the operation section 13B is an example of a hardware key for receiving the second operation. In the example described above, each of the button B11 and the button B12 is an example of the second image.

Although the embodiments of the present disclosure have been described in detail with reference to the drawings, specific configurations are not limited to the embodiments, and changes, substitutions, deletions, and the like may be made without departing from the spirit and scope of the present disclosure.

In addition, a program for implementing the functions of arbitrary components in the apparatus described above may be recorded in a computer-readable recording medium, and the program may be read and executed by a computer system. Here, the apparatus is, for example, the printing apparatus 1. Note that the "computer system" here includes hardware such as an operating system (OS) and peripheral devices. The "computer-readable recording medium" refers to a portable medium such as a flexible disk, a magneto-optical disk, a read only memory (ROM), or a compact disk (CD)-ROM, or a storage device such as a hard disk built in a computer system. Furthermore, the "computer-readable recording medium" includes a medium that holds a program for a certain period of time, such as a volatile memory inside a computer system serving as a server or a client when the program is transmitted via a network such as the Internet or a communication line such as a telephone line.

In addition, the above-described program may be transmitted from a computer system storing the program in a storage device or the like to another computer system via a transmission medium or by a transmission wave in the transmission medium. Here, the "transmission medium" for transmitting the program refers to a medium having a function of transmitting information, such as a network including the Internet or a communication line including a telephone line.

Further, the above-described program may be a program for implementing a part of the above-described functions. Further, the above-described program may be a so-called differential file or a differential program capable of implementing the above-described functions in combination with a program already recorded in the computer system.

What is claimed is:

1. A printing apparatus comprising:
   a control section causing a display section to display a target region in which at least one of a plurality of images is displayed;
   an operation section including a hardware key for receiving a first operation and a hardware key for receiving a direction designating operation for designating a direction from one or more directions; and
   a printing section,
   wherein
   the control section executes, in a first case where the target region is not displayed on the display section, a first function upon receiving the first operation, and
   in a second case where the target region is displayed on the display section, the control section causes, upon receiving the direction designating operation, a focus position on the target region to be moved in a direction designated by the direction designating operation and selects an image located at the focus position among the plurality of images as a selected image and causes, upon receiving the first operation, the focus position to be moved to a position of a first image which is predetermined among the plurality of images and selects the first image as the selected image.

2. The printing apparatus according to claim 1, wherein the first function is a function of transitioning to a predetermined home screen.

3. The printing apparatus according to claim 1, wherein the first image is an image associated with a function of confirming an input of information in the target region.

4. The printing apparatus according to claim 1, wherein the first function is a function of causing the display section to display an image for confirming whether to stop execution of printing by the printing section.

5. The printing apparatus according to claim 1, wherein the first image is an image associated with a function of canceling information just previously input in the target region.

6. The printing apparatus according to claim 1, wherein, upon receiving the first operation in a state in which the focus position is the position of the first image, the control section executes the first function.

7. The printing apparatus according to claim 1, wherein each of the plurality of images is an image configured to be selected in a numeric keypad image indicating a numeric keypad.

8. The printing apparatus according to claim 1, wherein
   the operation section further includes a hardware key for receiving a second operation, and
   the control section executes, when the target region is not displayed on the display section, a second function different from the first function upon receiving the second operation, and
   the control section causes, when the target region is displayed on the display section, upon receiving the second operation, the focus position to be moved to a position of a second image which is predetermined among the plurality of images and selects the second image as the selected image.

9. A non-transitory computer-readable storage medium storing a program for a computer of an electronic apparatus including an operation section having a hardware key for receiving a first operation and a hardware key for receiving a direction designating operation for designating a direction from one or more directions, the program causing the computer to perform:
a first display step of causing a display section to display a target region in which at least one of a plurality of images is displayed;
an executing step of executing, in a first case where the target region is not displayed on the display section, a first function upon receiving the first operation;
a first selection step of causing, in a second case where the target region is displayed on the display section, upon receiving the direction designating operation, a focus position on the target region to be moved in a direction designated by the direction designating operation and selecting an image located at the focus position among the plurality of images as a selected image; and
a second selection step of causing, when the target region is displayed on the display section, upon receiving the first operation, the focus position to be moved to a position of a first image which is predetermined among the plurality of images and selecting the first image as the selected image.

* * * * *